United States Patent [19]

Svala

[11] 4,310,723

[45] Jan. 12, 1982

[54] PARTY LINE APPARATUS

[76] Inventor: Carl G. Svala, 79 William St., Norwalk, Conn. 06851

[21] Appl. No.: 174,668

[22] Filed: Aug. 1, 1980

[51] Int. Cl.³ .................. H04M 3/16; H04M 13/00
[52] U.S. Cl. .......................... 179/17 A; 179/17 B; 179/17 E
[58] Field of Search .............. 179/17 R, 17 A, 17 B, 179/17 E, 18 FA, 18 FH, 27 E

[56] References Cited

U.S. PATENT DOCUMENTS

| | | | |
|---|---|---|---|
| 2,790,851 | 4/1957 | Berch | 179/17 E |
| 3,046,343 | 7/1962 | Cox | 179/17 A |
| 3,070,664 | 12/1962 | Ostline | 179/17 A |
| 3,382,322 | 5/1968 | Duerden et al. | 179/17 A |
| 3,579,254 | 5/1971 | Carmody et al. | 179/17 A |
| 3,662,116 | 5/1972 | Wittman | 179/17 E |
| 3,855,420 | 12/1974 | Steidl | 179/17 A |
| 3,927,270 | 12/1975 | Davis et al. | 179/17 A |

FOREIGN PATENT DOCUMENTS

| | | | |
|---|---|---|---|
| 1149406 | 5/1963 | Fed. Rep. of Germany | 179/17 B |
| 1252755 | 10/1967 | Fed. Rep. of Germany | 179/17 B |
| 1078795 | 8/1967 | United Kingdom | 179/17 B |

OTHER PUBLICATIONS

"Ringing Problems on Long Subscriber Loops", *Telephony*, 6-24-74, Henry W. Ott, pp. 33-40.

*Primary Examiner*—Gerald L. Brigance

[57] ABSTRACT

Privacy and selective ringing in a two-party line system are implemented by using unidirectional diodes in the speech circuit and the ringer circuit, respectively, of the subscriber instruments. The diodes in the first subscriber instrument are oppositely poled with respect to those in the second subscriber instrument. Current sensors, in response to the application of a DC biased AC monitoring signal, provide party identification by sensing the direction of current flow in the line. Line terminal apparatuses are then switched onto the line, in response to the party identification current sensors, to provide the correct line polarity for the identified party.

8 Claims, 1 Drawing Figure

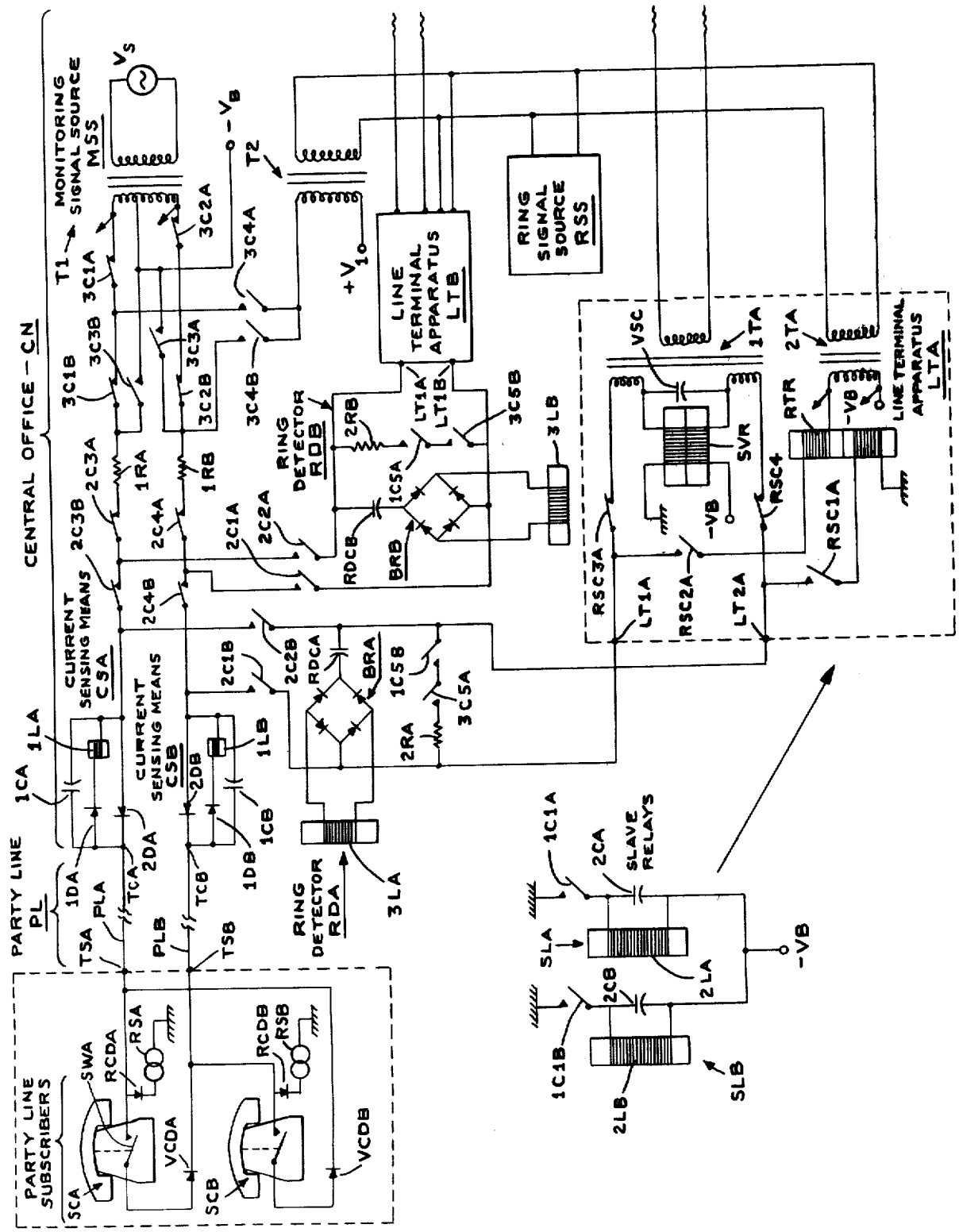

PARTY LINE APPARATUS

BACKGROUND OF THE INVENTION

This invention pertains to telephone and, more particularly, to party lines in a telephone system.

In order to save cable cost, it is quite common (especially in the United States) that telephone systems utilize party lines wherein a common subscriber line pair is shared by two subscribers. While party lines save cable costs, they create their own set of problems. More specifically, it is necessary to provide unique or selective ringing to each of the parties on the line. Furthermore, it is necessary to provide identification of the calling parties for billing purposes. In addition, there is the serious defect that the party on the line is afforded no privacy because the other party merely can listen in to the conversation by picking up his receiver.

In order to solve these problems, conventional party line arrangements rely on the serving telephone office being specifically designed and equipped to provide the service from a single line terminal. In addition, automatic identification relies on special circuit arrangements in the subscriber instrument to provide a ground return without adversely affecting the voice transmission. Although the utilization of special circuitry solves the first two problems, present day party lines are still confronted with the privacy problem.

SUMMARY OF THE INVENTION

It is an object of the invention to provide apparatus which will permit two subscribers to share at least part of the subscriber line with full privacy and which permits automatic line idenification and selective ringing.

It is another object of the invention to provide such apparatus which requires a minimum modification of the standard subscriber's telephone instrument normally used for single party operation.

It is a further object of the invention to provide such apparatus which is simple and reliable and can be added to the output terminals of a normal central office without modifying the central office equipment or a PABX.

Briefly, the invention is concerned with improvements in a party line telephone arrangement which has first and second subscriber instruments, each having a bell circuit, a speech circuit with a cradle switch, and a pair of transfer terminals connected, via first and second subscriber lines having subscriber ends connected to the respective terminals of the pair of transfer terminals and central terminal ends, to a central terminal office which includes first and second line terminal apparatuses respectively assigned to the first and second subscriber instruments, with each of the line terminal apparatuses including first and second terminals, during a non-ring state, being at a reference voltage level and a bias voltage level respectively. The improvement includes a first unidirectional conducting means for connecting the speech circuit of the first subscriber instrument between the pair of transfer terminals thereof so that current can only flow in a first direction through the first and second subscriber lines. There is also included a second unidirectional conducting means for connecting the speech circuit of the second subscriber instrument between the pair of transfer terminals thereof so that current can only flow in a second direction through the first and second subscriber lines. First further unidirectional conducting means connecting the bell circuit of the first subscriber instrument between the transfer terminal thereof connected to the first subscriber line and a given reference voltage so that current can flow through the bell circuit only in a given direction. Second further unidirectional conducting means connect the bell circuit of the second subscriber instrument between the transfer terminal thereof connected to the second subscriber line and the given reference voltage so that current can flow through the bell circuit thereof only in the given direction. Source means apply a d.c.-biassed alternating current monitoring signal to central terminal ends of the first and second subscriber lines respectively, the instantaneous amplitude of the monitoring signal being no greater than the reference voltage. First switching means associated with one of the subscriber instruments and operative upon sensing the flow of current through the subscriber lines in a first direction switches the connection of the central terminal ends of the subscriber lines from the source means to the terminals of the first line terminal apparatus so that the d.c. potential of one subscriber line is greater than the d.c. potential of the other subscriber line. Second switching means associated with the other of the subscriber instruments and operative upon sensing the flow of current through the subscriber lines in a second and opposite direction switches the connection of the central terminal ends of the subscriber lines from the source means to the terminals of the second line terminal apparatus so that the d.c. potential of the one subscriber line is less than the d.c. potential of the other subscriber line.

BRIEF DESCRIPTION OF THE DRAWINGS

Other objects, the features and advantages of the invention will be apparent from the following detailed description when read in conjunction with the accompanying drawing whose sole FIGURE shows the present preferred embodiment of the invention incorporated in a party line telephone system.

DESCRIPTION OF THE PREFERRED EMBODIMENT OF THE INVENTION

In the drawing there is shown a party line arrangement including a two-wire subscriber party-line having its remote terminals TSA and TSB connected in parallel to the two subscriber instruments SCA and SCB and having its central terminals TCA and TCB connected to the central office CN.

A typical subscriber instrument SCA is a conventional telephone having voice circuits in series with the hook switch SWA and having a ringing circuit RSA which may have one terminal connected to ground. The only modifications made to the telephone are the incorporation in the ringing circuit of a diode such as the diode RCDA which permits ring current to flow only from the terminal TSA to ground and the diode VCDA in the voice circuit to permit current flow only in the direction from terminal TSA to terminal TSB. It will be noted that the subscriber instrument SCB is identically modified; however, in this case the diode RBD permits ring current only from the terminal TSB to ground and the voice circuit diode VCDB permits current flow only from the terminal TSB to the terminal TSA.

It should be noted that although the instruments have been modified in the same consistent manner, the instruments are connected to the party line in an opposite sense.

The first modification in the central office is the inclusion of a source of a monitoring signal. More particularly, the monitoring signal source MSS comprises the transformer T1 having a primary winding receiving an alternating current signal with a frequency such as the frequency of the ring current and a center tapped secondary whose center tap is returned to a negative bias voltage $-V_B$. One of the output arms of the second winding of the transformer T1 is connected to the terminal TCA of the party line and the other is connected to the terminal TCB of the party line (for the minute one should ignore all of the switching circuits therein and assume conduction exists). In this manner, there is transmitted to the party line an alternating current signal superimposed on a d.c. signal. In view of the fact that the ring circuits of the subscriber instruments are returned to a reference potential of ground, the bias voltage and the amplitude of the alternating current signal are chosen such that the superimposed signal on the line PLA never exceeds ground potential and, similarly, the instantaneous amplitude of the signal on line PLB never exceeds such ground potential. In this way, it is not possible for the monitoring signal to erroneously energize either of the ring circuits.

In series with each of the lines of the party line pair PL, there is a current sensing means such as the current sensing means CSA in the path from the terminal TCA to the upper arm of the secondary winding of the transformer T1. The current sensing means includes three circuits in parallel. Of these circuits, the actual sensing is performed by the circuit including the relay coil 1LA in series with the diode 1DA. Thus, whenever a direct current flows from the terminal TCA towards the transformer, this relay will be energized. Associated with this relay is a slave relay SLA having a winding 2LA. It is seen that winding 2LA of the slave relay SLA is connected to ground potential and the voltage $-V_B$ under the control of the normally open contact set 1C1A. This contact set is the only contact set operated by the coil of relay 1LA. This permits very sensitive current sensing and relies on the slave relay to do all of the switching control. Accordingly, one can make the sensing relay of the reed-type. The current sensing means CSA also includes the diode 2DA polarized in the direction opposite to that of diode 1DA to provide circuit continuity when current flows in the opposite direction. Furthermore, there is provided in parallel with the current sensing relay and diode 1DA a capacitor 1CA whose function to provide a low impedance path for voice signals and also to slow the release of the relay when the d.c. current falls and goes in the opposite direction. In a similar d.c. manner, the coil 2LA of the slave relay SLA is provided with a capacitor 2CA whose function is also to provide a delay upon opening of the contact set 1C1A. In some cases, the capacitor 2CA can be dispensed with and the relay SLA can be of the slow release type using copper slugs at the rear of the relay coil.

Each of the slave relays SLA and SLB have two normally open contact sets and two normally closed contact sets. For example, the slave relay SLB has the pair of normally closed contact sets 2C3B and 2C4B connected in series between the respective current sensing means CSA and CSB and the output arms of the second winding of transformer T1. Similarly, the slave relay 2LA has the normally closed contact sets 2C3A which perform a similar function for that relay. The slave relay SLB has the normally open contact sets 2C1B and 2C2B which controllably connect the lines of the party line to the terminals LT1A and LT2A of the line apparatus LTA. Similarly, the slave relay SLA has the normally open contacts 2C1A and 2C2A which control connection to the terminals LT1B and LT2B of the line apparatus LTB. The line terminal apparatuses then connect the party line to the remainder of the central office.

Before proceeding further, there will be described how a request for service, for example from subscriber instrument SCA associated with one of the subscriber terminals is detected. When a receive is "on hook", then its associated hook switch such as switch SWA is open and there is no d.c. path through the instrument. With both instruments on hook, there is no d.c. path associated with the party line pair and only a small current due to capacitive loading from the line can be sensed at the central office CN. A function of the capacitors 1CA and 1CB is to bypass these capacitive currents so that no rectification takes place in the bypass diodes 1DA and 2DB. Accordingly, for an idle line, there is no d.c. current through the coils 1LA and 1LB of the current sensing relays and, therefore, they are in an unenergized state and consequently the slave relays are in the same state. If now the instrument SCA goes off hook (the subscriber wants service), a path is established between the terminals TSA and TSB via the internal circuitry of the telephone instrument in series with the diode VCDA. Consequently, the alternating voltage between these two terminals will give rise to a d.c. current which is sensed by the sensing relay CSB. In particular, a d.c. path is established from the upper arm of the secondary of transformer T1 via the closed contact sets and protective resistor 1RA, and the diode 2DA to the terminal TSA, then through the telephone set to the terminal TSB and from the terminal TSB via the diode 1DB, the coil of the relay 1LB, the series of closed contact sets and protective resistor 1RB to the lower arm of the secondary winding of the transformer T1. The d.c. current flowing through the coil 1LB causes the relay to energize; closing its contact set 1C1B which in turn energizes the coil 2LB of the slave relay SLB. The slave relay SLB is energized, opening its contact sets 2C3B and 2C4B and closing its contact sets 2C1B and 2C2B. Thus, the monitoring signal is disconnected from the party line which is now connected to the line terminal apparatus LTA which now provides d.c. current for holding in the relay 1LB and therefore the slave relay SLB. A similar operation would occur upon the lifting of the cradle of the subscriber instrument SCB.

The remainder of the specification is concerned with the receiving of calls by either one of the subscribers. In order to satisfactorily discuss this portion of the invention, it is first necessary to describe briefly a typical line terminal apparatus. The line terminal apparatus LTA concerned with the subscriber instrument SCA includes a voice circuit and a ringing circuit. The voice circuit centers around the voice transformer 1TA having a primary winding connected to the voice circuits in the central and split secondary winding. The split secondary winding is connected to the respective windings of a supervision relay SVR. Thus, one side of the secondary winding has one end connected, via contact set RSC3A to the terminal LT1A of the apparatus and via the one winding of the relay SVR to ground potential. The other side of the winding has one end connected, via contact set RSC4A, to the terminal LT2A of the apparatus and its other end connected via the other winding of the relay SVR to the potential $-V_B$. It should be noted that the capacitor VSC provides a low impedance for voice signals and in effect connects the two sides of the split secondary winding. The ring circuit includes the transformer 2TA having its primary winding connected to the ring signal source RSS and its secondary winding connected between the bias voltage $-V_B$ and one end of one of the windings of the balanced ring trip relay RTR, the other end of said winding being connected, via the contact set RS2CA, to terminal LT1A. Similarly, the other winding of the balanced ring trip RTR is connected between ground potential and, via the contact set RSC1A to terminal LT2A. The contact sets TSC1A to RSC4A are associated with a ring relay that is energized by the central office whenever the subscriber SCA is to be called. At that time, the normally open contact sets RSC1A and RSC2A close and the normally closed contact sets RSC3A and RSC4A open. Since these circuits, i.e., the ring circuits and the voice circuits, are well-known in the telephone arts they will be no further described.

Further modifications to the central station concerned with the present invention center around the ring detectors RDA, RDB, respectively, associated with the subscriber instruments SCA and SCB, and the transformer T2 whose primary winding is connected to the ring signal source RSS and whose secondary winding is connected via relay contacts to the monitoring signal source.

The function of a ring detector is to disconnect the party line PL from the monitoring signal and connect it to the ring signal emitted by the secondary winding of the transformer T2 upon the detection of a ring signal at the output terminals of a line terminal apparatus. The typical ring detector RDA associated with subscriber instrument SCA includes the series circuit of the bridge rectifier BRA and the coupling capacitor RDCA connected across the output terminals LT1A and LT2A of the line terminal apparatus LTA. Connected across the output terminals of the bridge rectifier BRA is the winding 3LA of the ring detector relay RDA. This relay has the normally closed contact sets 3C1A and 3C2A and the normally open contact sets 3C3A and 3C4A. (The ring detector RDB for the line terminal apparatus LTB is similarly constructed and will not be described in detail.) There will now be described the operation when one of the subscribers is being called.

Assume that the subscriber instrument SCA is being called. In that case, the ring signal will be applied to the transformer 2TA of the line terminal apparatus LTA immediately after the ring relay associated therewith has been energized. Accordingly, the contact sets RSC1A and RSC2A close and the contact sets RSC3A and RSC4A open. Accordingly, the terminal LT1A is at a voltage of $-V_B$ and the terminal LT2A is at a voltage of ground d.c. wise. Note that the contact sets 2C1B and 2C2B are open so that the line apparatus is not connected to the party line. However, the ring signal is emitted on the terminals LT1A and LT2A and is detected by the ring detector RDA which energizes its relay 3LA. The energization of the relay 3LA connects the secondary winding of the transformer T2 to the party line and disconnects the monitoring signal therefrom. The closing of the contact set 3C3A applies the voltage $-V_B$ to the terminal TSB effectively back-biasing the diode RCDB of the subscriber instrument SCB. The closing of the contact set 3C4A effectively connects the ring signal with a superimposed positive voltage $V_1$ to the terminal TSA. Accordingly, the diode RCDA of the subscriber instrument SCA is forward-biased and the ring signal activates the ring circuit thereof. When the subscriber picks up the receiver, the cradle switch closes and the current sensing relay CSB operates, connecting the party line to the line terminal apparatus LTA as previously described. If the ring had been from the line terminal apparatus LT2B, a similar operation would occur with the ring circuit of the subscriber instrument SCB being energized.

There will now be described the possibility that an incoming call arrives when the line is already in use. To take care of this eventuality, there is connected across the output terminals LT1A and LT2A of the line terminal apparatus LTA a series circuit including an impedance 2RA, the normally open contact set 3C5A associated with the ring detector relay RDA and the normally open contact set 1C5B associated with the slave relay SLB. (Similarly, the line terminal apparatus LTB would have a series circuit of the impedance 2RB, the normally open contact set 1C5A of the slave relay SLA and the normally open contact set 3C5B of its own ring detector relay RDB.) Assume the subscriber instrument SCA is using the line and a call comes in for the subscriber instrument SCB. Since the subscriber instrument SCA has the line, the contact set 1C5A will be closed. When the ring is emitted on the terminals LT1B and LT2B, the ring detector RDB will be energized, closing the contact sets 3C5B and effectively the terminals LT1B and LT2B are closed circuitted across an impedance. This closed loop will make the ring trip relay therein operate temporarily. The temporary operation of the ring trip relay should be recognized by the control system of the central office and will be interpreted as an answer. However, when the ring signal ceases, the ring detector relay will release and the terminals LT1B and LT2B will again face an open circuit. This situation immediately following an apparent answer will under the normal operation of the common control of the central office be interpreted as an answer followed by an immediate release and will result in a busy signal extended to the originating party.

It should be noted that the ring signal at the terminals LT1B and LT2B does not reach the party line because the contact sets 2C3B and 2C4B are open since the subscriber instrument SCA is in operation.

While only one embodiment of the invention has been shown and described in detail, there will now be obvious to those skilled in the art many modifications and variations satisfying many or all of the objects of the invention but not departing from the spirit thereof as defined by the appended claims.

What is claimed is:

1. In a party line telephone arrangement having: first and second subscriber instruments each including a bell circuit, a speech circuit with a cradle switch, and a pair of transfer terminals; first and second subscriber lines with subscriber ends connected to the respective terminals of the pair of transfer terminals and central terminal ends; and a central office including first and second line terminal apparatuses respectively assigned to the first and second subscriber telephones, each of said line terminal apparatuses including first and second terminals being at, during a non-ring state, a reference voltage level and a bias voltage level respectively, the improvement comprising: first unidirectional conducting means for connecting the speech circuit of the first subscriber instrument between the pair of transfer terminals thereof whereby current can only flow in a first direction through the first and second subscriber lines; second unidirectional conducting means for connecting the speech circuit of the second subscriber instrument between the pair of transfer terminals thereof whereby current can only flow in a second and opposite direction through the first and second subscriber lines; first further unidirectional conducting means for connecting the bell circuit of the first subscriber instrument between the transfer terminal thereof connected to the first subscriber line and a given reference voltage whereby current can flow through the bell circuit only in a given direction; second further unidirectional conducting means for connecting the bell circuit of the second subscriber instrument between the transfer terminal thereof connected to the second subscriber line and said given reference voltage whereby current can flow through the bell circuit thereof only in said given direction; source means for applying a d.c.-biased alternating current monitoring signal to central terminal ends of the first and second subscriber lines respectively, the instantaneous amplitude of said monitoring signal being no greater than said reference voltage; first switching means associated with one of the subscriber instruments and operative upon sensing the flow of current through the subscriber lines in a first direction for switching the connection of the central terminal ends of the subscriber lines from said source means to the terminals of the first line terminal apparatus whereby the d.c. potential of one subscriber line is greater than the d.c. potential of the other subscriber line; and second switching means associated with the other of the subscriber instrument and operative upon sensing the flow of current through the subscriber lines in a second and opposite direction for switching the connection of the central terminal ends of the subscriber lines from said source means to the terminals of the second line terminal apparatus whereby the d.c. potential of said one subscriber line is less than the d.c. potential of said other subscriber line.

2. The arrangement of claim 1 wherein the arrangement further includes a source of a ring signal and means for applying the ring signal to the terminals of first and second ring signal detection means connected to the terminals of the first and second line apparatuses, respectively, each of said ring signal detection means including means operative upon sensing a ring signal for switching the connection of the central terminal ends of the subscriber lines from said source means to another pair of terminals, one of said terminals being connected to a voltage source, the other of said terminals receiving said ring signal, the connection to said another pair of terminals and the amplitude and polarity of the voltage source and the amplitude of the ring signal being such that when a ring signal is applied to one line terminal apparatus said further unidirectional conducting means of the subscriber instrument associated with the other line terminal apparatus is back-biassed to nonconduction.

3. The arrangement of claim 1 or 2 wherein each of said switching means comprises a current sensing means for sensing for the direction of current flow in the subscriber lines and a switching device operated by said current sensing means.

4. The arrangement of claim 3 wherein said current sensing means comprises a reed relay with a single contact set and said switching device comprises a slave relay whose coil is connected via said single contact set across a source of electrical energy, and a plurality of transfer contact sets for performing the switching of the subscriber.

5. The arrangement of claim 4 wherein a first diode is connected in a first current flow direction in series with said relay and a second diode is connected in a second current flow direction is parallel with the series combination of said first diode and said reed relay.

6. The arrangement of claim 5 further comprising a filtering capacitor connected in parallel with said first diode and reed relay series combination.

7. The arrangement of claim 5 wherein said slave relay is of the delayed release type.

8. The arrangement of claim 2 further comprising a series circuit connected across the first and second terminals of each line terminal apparatus, each of said series circuits including first and second switching elements and a resistance connected in series, each of said first switching elements being normally non-conductive but becoming conductive upon operation of the ring detection means of the particular line circuit apparatus related to one subscriber telephone; and each of said second switching element being normally non-conductive but becoming conductive upon operation of the switching means associated with the other subscriber instrument.

* * * * *